US011915843B2

(12) United States Patent
Kato et al.

(10) Patent No.: US 11,915,843 B2
(45) Date of Patent: Feb. 27, 2024

(54) MULTICORE CABLE

(71) Applicant: SUMITOMO ELECTRIC INDUSTRIES, LTD., Osaka (JP)

(72) Inventors: Hirotaka Kato, Tochigi (JP); Jo Yagisawa, Tochigi (JP); Takumi Ooshima, Tochigi (JP); Takaya Kohori, Tochigi (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 18/152,386

(22) Filed: Jan. 10, 2023

(65) Prior Publication Data

US 2023/0245799 A1 Aug. 3, 2023

(30) Foreign Application Priority Data

Jan. 31, 2022 (JP) ................................ 2022-013663

(51) Int. Cl.

| | |
|---|---|
| ***H01B 11/20*** | (2006.01) |
| ***H01B 7/18*** | (2006.01) |
| ***H01B 7/00*** | (2006.01) |
| ***H01B 11/00*** | (2006.01) |
| ***H01B 9/00*** | (2006.01) |
| ***H01B 7/08*** | (2006.01) |

(52) U.S. Cl.

CPC ............ *H01B 7/18* (2013.01); *H01B 7/0009* (2013.01); *H01B 7/0876* (2013.01); *H01B 9/006* (2013.01); *H01B 11/002* (2013.01)

(58) Field of Classification Search

CPC ... H01B 3/30; H01B 3/50; H01B 3/54; H01B 7/009; H01B 7/02; H01B 7/04; H01B 7/18; H01B 7/1875; H01B 7/28; H01B 7/295; H01B 9/003; H01B 11/20; H01B 11/002

USPC .... 174/110 R–110 PM, 113 R, 120 R–121 R

See application file for complete search history.

(56) References Cited

U.S. PATENT DOCUMENTS

| | | | | |
|---|---|---|---|---|
| 10,102,994 B2* | 10/2018 | Geier | H01R 13/426 | |
| 2014/0326480 A1* | 11/2014 | Hashimoto | H01B 7/295 | 174/113 R |
| 2015/0165987 A1* | 6/2015 | Hayakawa | H01B 7/0045 | 174/72 A |
| 2019/0172606 A1* | 6/2019 | Kohori | H01B 7/1875 | |

FOREIGN PATENT DOCUMENTS

| | | |
|---|---|---|
| JP | 3065274 U | 2/2000 |

* cited by examiner

*Primary Examiner* — William H. Mayo, III

(74) *Attorney, Agent, or Firm* — IPUSA, PLLC

(57) ABSTRACT

A multicore cable includes a plurality of covered wires having a lubricant powder provided on surfaces thereof, and an outer sheath layer covering outer surfaces of the plurality of covered wires. The outer surfaces of the plurality of covered wires, and the outer sheath layer, make contact with one another via the lubricant powder. A coverage of the outer surfaces of the plurality of covered wires by the lubricant powder is greater than or equal to 15%.

8 Claims, 8 Drawing Sheets

30

130

MULTICORE CABLE

CROSS-REFERENCE TO RELATED APPLICATIONS

This application is based upon and claims priority to Japanese Patent Application No. 2022-013663, filed on Jan. 31, 2022, the entire contents of which are incorporated herein by reference.

BACKGROUND OF THE INVENTION

1. Field of the Invention

Certain aspects of the embodiments discussed herein are related to multicore cables.

2. Description of the Related Art

As an example, Japanese Registered Utility Model No. 3065274 proposes a covered wire having a sheathing resin provided around a wrapping tape which is wound around a plurality of wires or cables.

Conventionally, a multicore cable including a plurality of covered wires is in use. In the multicore cable, a tape body called a wrapping tape is wound spirally around outer peripheries of the plurality of covered wires, and the wrapping tape is disposed between the plurality of covered wires and an outer sheath layer, as proposed in Japanese Registered Utility Model No. 3065274, for example.

However, in the multicore cable having the wrapping tape disposed between the plurality of covered wires and the outer sheath layer, moisture or the like may enter the multicore cable from an end portion of the multicore cable, into a gap between the wrapping tape and the covered wires, or by following along the wrapping tape. Hence, it is conceivable to configure the multicore cable without the wrapping tape, so that the plurality of covered wires and the outer sheath layer make direct contact with each other. However, in this case, there is a problem that stripping properties or the like at the time of stripping the outer sheath layer deteriorate. For this reason, there are demands for a multicore cable having the outer sheath layer with excellent stripping properties, even in a case where the wrapping tape is not disposed between the outer sheath layer and the plurality of covered wires.

SUMMARY OF THE INVENTION

According to one aspect of the present disclosure, a multicore cable includes a plurality of covered wires having a lubricant powder provided on surfaces thereof; and an outer sheath layer covering outer surfaces of the plurality of covered wires, wherein the outer surfaces of the plurality of covered wires, and the outer sheath layer, make contact with one another via the lubricant powder, and a coverage of the outer surfaces of the plurality of covered wires by the lubricant powder is greater than or equal to 15%.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF THE EMBODIMENTS

Figure 1:
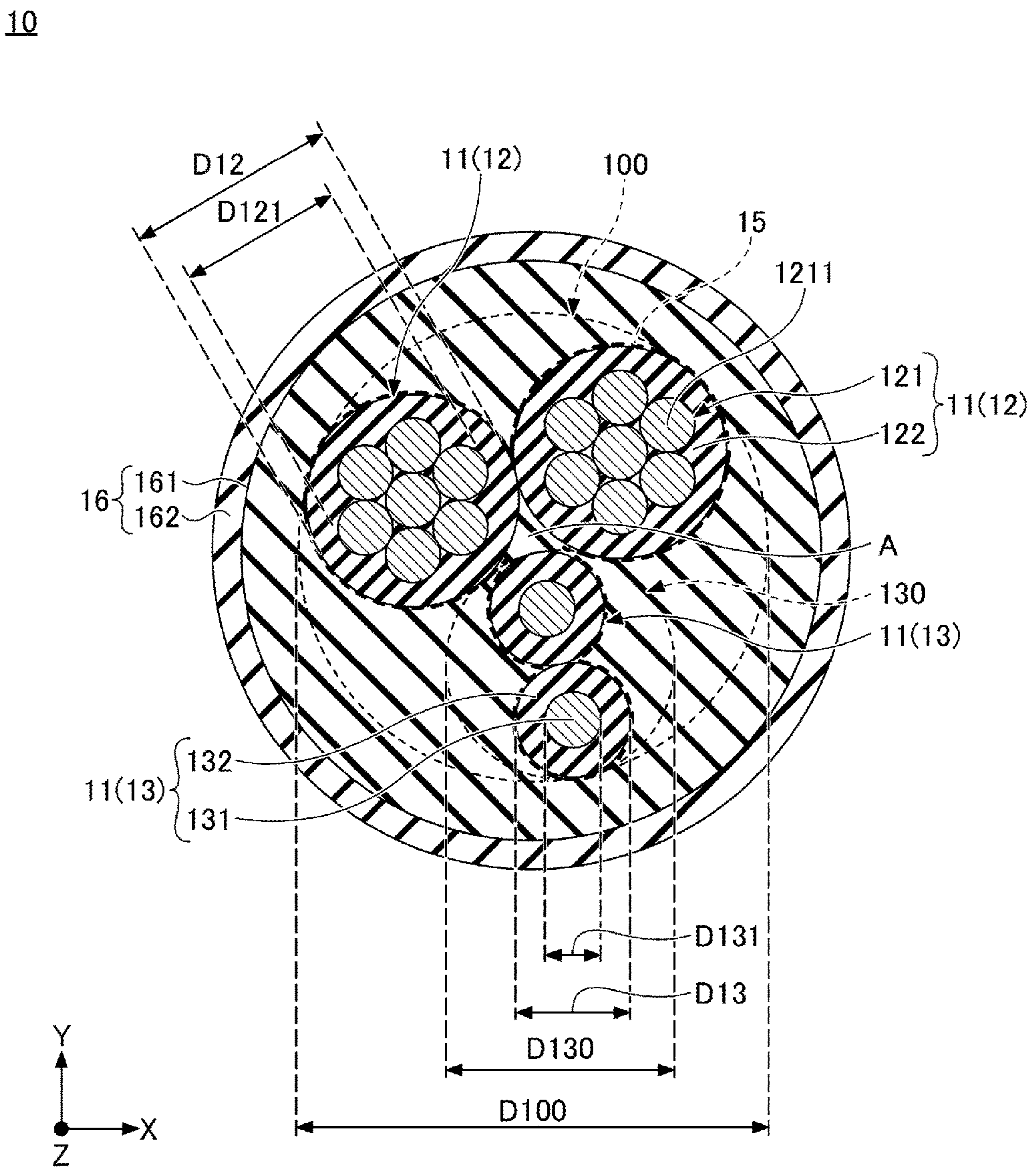
FIG. 1 is a cross sectional view of a first configuration example perpendicular to a longitudinal direction of a multicore cable according to one aspect of the present disclosure.

One object according to one aspect of the present disclosure is to provide a multicore cable having an outer sheath layer with excellent stripping properties, even in a case where a wrapping tape is not disposed between the outer sheath layer and a plurality of covered wires.

Preferred embodiments of the present invention will be described with reference to the accompanying drawings.

[Description of Embodiments of the Present Disclosure]

First, embodiments of the present disclosure will be described in conjunction with the drawings. In the drawings, those parts that are the same are designated by the same reference numerals, and a repeated description of the same parts may be omitted in the following description.

[1] A multicore cable according to one aspect of the present disclosure includes a plurality of covered wires having a lubricant powder provided on surfaces thereof; and an outer sheath layer covering outer surfaces of the plurality of covered wires, wherein the outer surfaces of the plurality of covered wires, and the outer sheath layer, make contact with one another via the lubricant powder, and a coverage of the outer surfaces of the plurality of covered wires by the lubricant powder is greater than or equal to 15%.

By employing a configuration in which the outer surfaces of the plurality of covered wires and the outer sheath layer are in contact with each other via the lubricant powder, it is possible to reduce water entering inside of the multicore cable when compared to a case where a wrapping tape or the like is disposed on the outer surfaces of the plurality of covered wires.

By disposing the lubricant powder on the outer surfaces of the plurality of covered wires, and setting the coverage of the outer surfaces of the plurality of covered wires by the lubricant powder to a value greater than or equal to 15%, the outer sheath layer can easily be stripped off from the plurality of covered wires. For this reason, at the end portion of the multicore cable, the outer sheath layer can easily be removed using a wire stripper, for example, and the multicore cable can have excellent stripping properties and processability. Further, by setting the coverage to the value greater than or equal to 15%, it is possible to reduce a force applied to the plurality of covered wires from the outer sheath layer when the multicore cable is bent, to thereby also improve a flexing resistance.

[2] The coverage may be in a range greater than or equal to 25% and less than or equal to 70%.

By setting the coverage to a value greater than or equal to 25%, it is possible to improve the stripping properties, the processability, and the flexing resistance in particular,.

By setting the coverage to a value less than or equal to 70%, it is possible to sufficiently reduce scattering of the lubricant powder to a surrounding when removing a portion of the outer sheath layer at the end portion of the multicore cable in order to connect the multicore cable to a device or the like.

[3] The plurality of covered wires may include power lines, and twisted pair signal wires.

The power lines can be used to supply power to connected devices, for example, and the twisted pair signal wires can be used to transmit signals between devices, for example. Because these functions are often required of the multicore cable, the plurality of covered wires, including the power lines and the twisted pair signal wires, can be used as a multicore cable for connecting various devices.

[4] The plurality of covered wires may include twisted pair cables.

Because the multicore cable includes the twisted pair cables, the multicore cable can be used in various applications, and a versatile multicore cable can be obtained.

[5] The lubricant powder may include talc.

When the lubricant powder includes talc, it is possible to particularly improve the stripping properties of the outer sheath layer.

[6] The outer sheath layer may include a first outer sheath layer disposed on a side of the plurality of covered wires, and a second outer sheath layer covering an outer surface of the first outer sheath layer.

By employing a configuration in which the outer sheath layer includes a plurality of layers, properties such as an elastic modulus or the like can be selected for each layer of the outer sheath layer, and properties such as adhesion between the outer sheath layer and the plurality of covered wires, a flexing resistance of the multicore cable, or the like can easily be adjusted and selected.

[Details of Embodiments of the Present Disclosure]

Specific examples of the multicore cable according to one aspect of the present disclosure (hereinafter referred to as "present embodiment") will be described in the following, with reference to the drawings. The present invention is not limited to these examples and embodiments, and various omissions, substitutions, and modifications of the examples and embodiments may be made without departing from the spirit of the present disclosure. The accompanying claims and their equivalents thereof are intended to cover such forms or modifications as would fall within the scope and spirit of the present disclosure.

(1) Configuration Example of Multicore Cable:

First, a configuration example of the multicore cable according to the present embodiment will be described, with reference to FIG. 1 through FIG. 5B.

Figure 2:
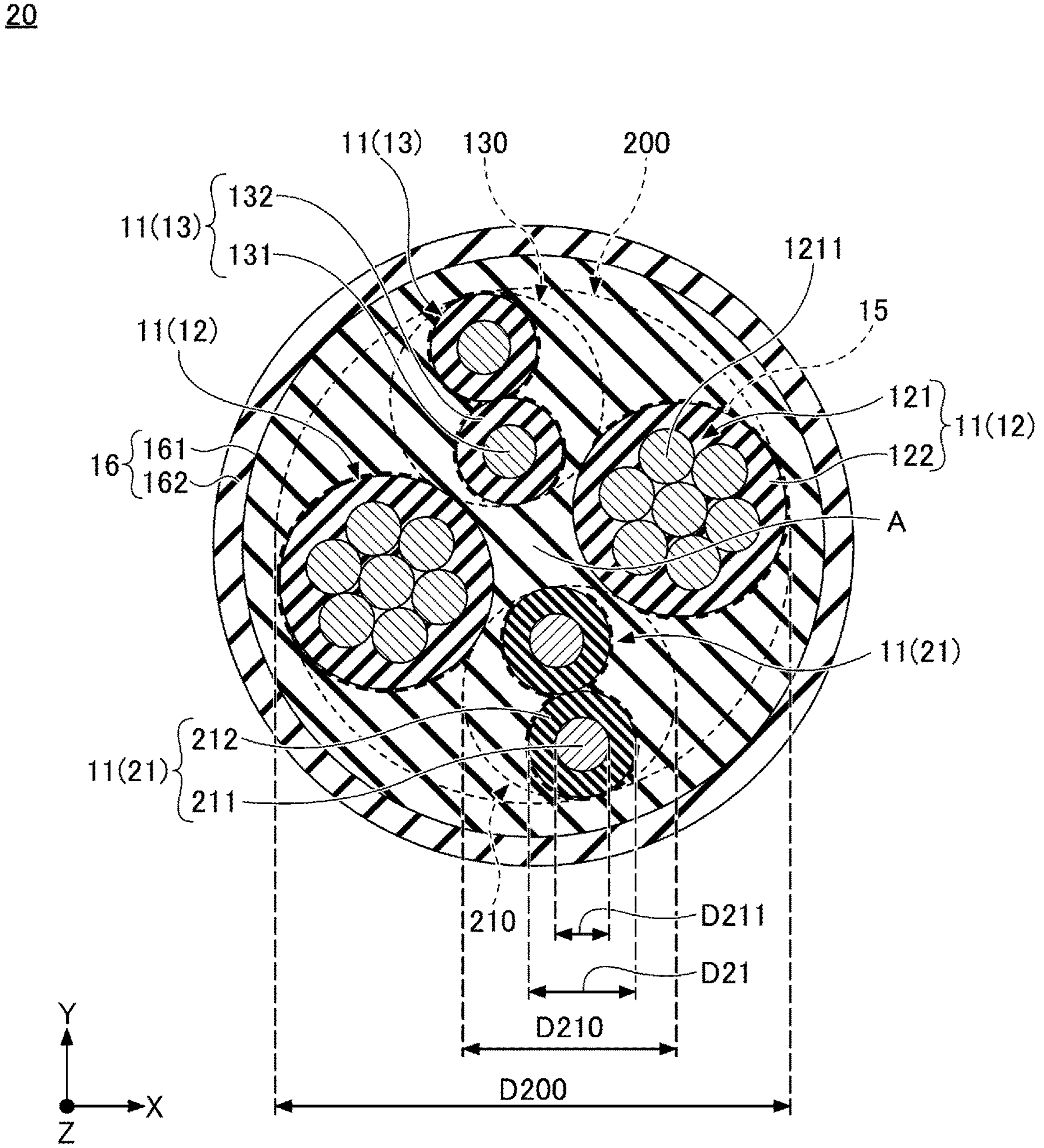
FIG. 2 is a cross sectional view of a second configuration example perpendicular to the longitudinal direction of the multicore cable according to one aspect of the present disclosure.
Figure 3:
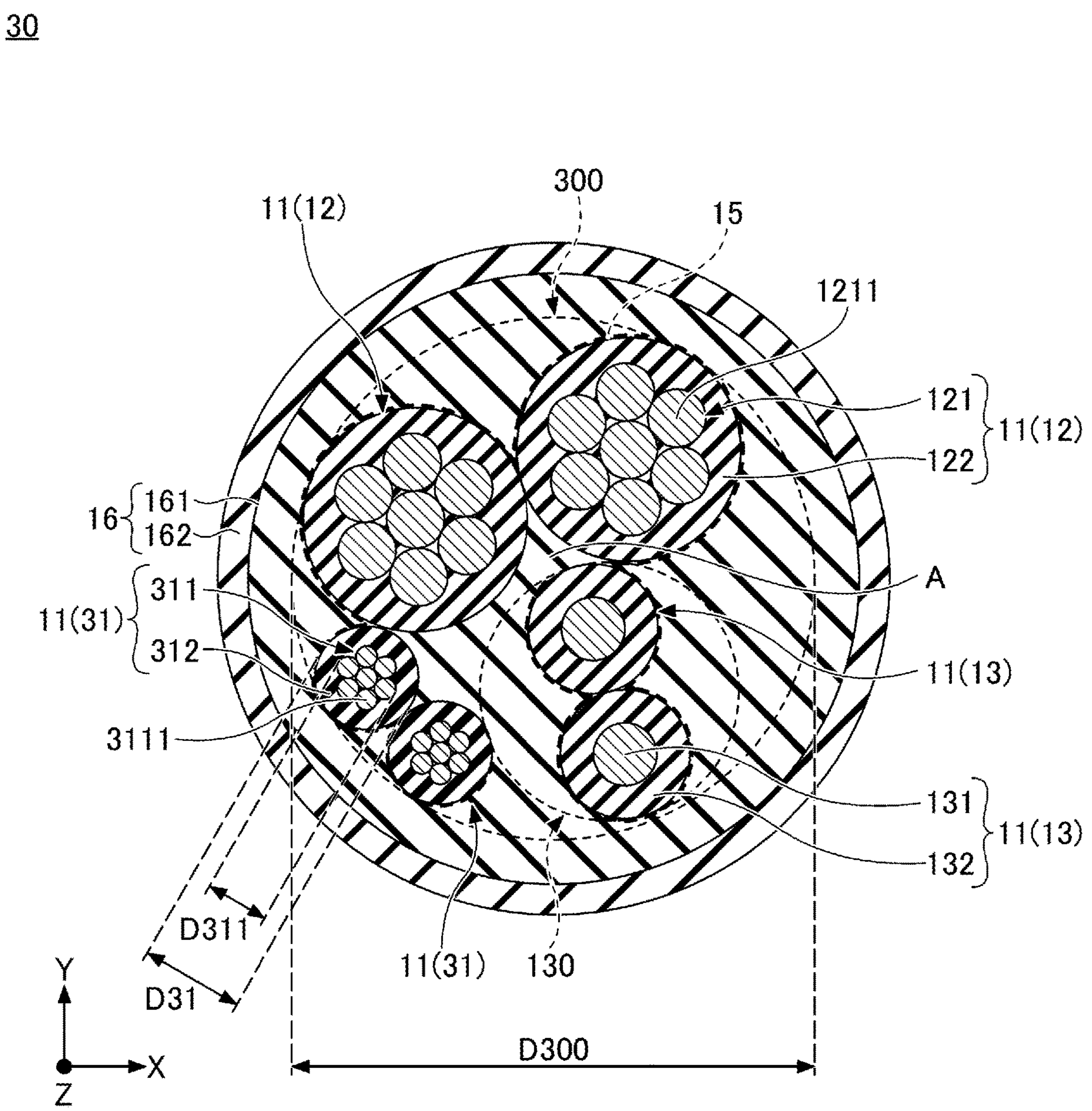
FIG. 3 is a cross sectional view of a third configuration example perpendicular to the longitudinal direction of the multicore cable according to one aspect of the present disclosure.

For the sake of convenience by taking into consideration the limited space on paper including the paper width, reference numerals indicating lengths of power lines 12, signal wires 13, and twisted pair signal wire 130 are illustrated in FIG. 1. Further, reference numerals indicating lengths of a wire 21 and a twisted pair cable 210 are illustrated in FIG. 2, and a reference numeral indicating a length of a power line 31 is illustrated in FIG. 3.

As illustrated in FIG. 1 through FIG. 4, the multicore cable of the present embodiment includes a plurality of covered wires 11 having a lubricant powder 15 disposed on surfaces thereof, and an outer sheath layer 16 covering outer surfaces of the plurality of covered wires 11. In FIG. 1 through FIG. 4, a Z-axis direction perpendicular to a paper surface of each drawing corresponds to a longitudinal direction of multicore cables 10 through 40, the covered wires 11, cores 100 through 400, or the like. In addition, an XY-plane formed by an X-axis and a Y-axis corresponds to a plane perpendicular to the longitudinal direction of the multicore cables 10 through 40 or the like.

<Configuration of FIG. 1>

FIG. 1 is a cross sectional view of a first configuration example perpendicular to the longitudinal direction of the multicore cable 10 according to the present embodiment.

As illustrated in FIG. 1, the multicore cable 10 of the present embodiment can include, as the covered wires 11, two power lines 12, and the twisted pair signal wire 130 in which two signal wires 13 are stranded or twisted together, for example. That is, the plurality of covered wires 11 can include the power lines 12 and the twisted pair signal wire 130, for example.

The power lines 12 can be used to supply power to connected devices, for example, and the twisted pair signal wire 130 can be used to transmit signals between devices, for example. Because these functions are often required of the multicore cable, the plurality of covered wires 11, including the power lines 12 and the twisted pair signal wire 130, can be used as a multicore cable for connecting various devices.

The multicore cable 10 can include, as the covered wires 11, the power lines 12 and the twisted pair signal wire 130 that are stranded or twisted together, to form a core 100. When the covered wires foaming the core 100 are stranded or twisted together, a twisting direction is not particularly limited, and the covered wires may be twisted counterclockwise or clockwise. The same applies to each of cores 200 through 400 that will be described later.

The configuration of the plurality of covered wires included in the multicore cable according to the present embodiment is not limited to the configuration example illustrated in FIG. 1, and an arbitrary number of covered wires having an arbitrary configuration can be included in the multicore cable, according to the device or the like to which the multicore cable is connected. Other configuration examples of the plurality of covered wires included in the multicore cable according to the present embodiment will be described in the following.

<Configuration of FIG. 2>

FIG. 2 is a cross sectional view of a second configuration example perpendicular to the longitudinal direction of the multicore cable 20 according to the present embodiment.

As illustrated in FIG. 2, the multicore cable 20 illustrated in FIG. 2 includes, as the covered wires 11, the twisted pair cable 210 in which two wires 21 are stranded or twisted together, in addition to the two power lines 12, and the twisted pair signal wire 130 in which two signal wires 13 are stranded or twisted together, for example. That is, in the multicore cable 20, the plurality of covered wires 11 include the twisted pair cable 210. In the multicore cable 20 illustrated in FIG. 2, the core 200 includes the twisted pair cable 210. Moreover, the power lines 12, the twisted pair signal wire 130, and the twisted pair cable 210 are stranded or twisted together.

Because the multicore cable 20 includes the twisted pair cable 210, the multicore cable 20 can be used in various applications, and a versatile multicore cable can be obtained.

Although each of the multicore cables 10 and 20 illustrated in FIG. 1 and FIG. 2 includes only one twisted pair signal wire 130, the number of twisted pair signal wires 130 included in the multicore cable is not particularly limited, and may be two or greater.

For example, the twisted pair cable 210 in FIG. 2 may be replaced with the twisted pair signal wire 130, to thereby obtain a multicore cable including two twisted pair signal wires.

When two twisted pair signal wires 130 are provided as described above, it is preferable that one of the two power lines 12 makes contact with both of the two twisted pair signal wires 130, and that the other of the two power lines 12 makes contact with both of the two twisted pair signal wires 130. Moreover, from a viewpoint of improving the flexing resistance of the multicore cable, it is preferable to provide a gap between the two power lines 12 so as to prevent mutual contact, and to provide a gap between the two twisted pair signal wires 130 so as to prevent mutual contact. That is, in the multicore cable 20 illustrated in FIG. 2, it is preferable to dispose each of the wires similarly to a case where the twisted pair cable 210 is replaced with the twisted pair signal wire 130.

In the present specification, the "flexing resistance" refers to a property that makes the covered wires inside the multicore cable uneasily broken, even when the multicore cable is bent repeatedly.

<Configuration of FIG. 3>

The multicore cable can include three or more power lines.

The multicore cable 30 illustrated in FIG. 3 includes two power lines 31, in addition to the two power lines 12. When distinguishing the two types of power lines in FIG. 3 from each other, the power line 12 may be referred to as a first power line, and the power line 31 may be referred to as a second power line.

In a case where the multicore cable includes three or more power lines, the multicore cable may be formed solely of power lines having the same outer diameter, power lines with first conductors having the same outer diameter, or the like. The first conductors will be described later. Alternatively, the multicore cable can include a combination of power lines having different outer diameters, power lines with first conductors having different outer diameters, or the like, as in the multicore cable 30 illustrated in FIG. 3.

The two second power lines do not need to be stranded or twisted together by themselves, and the two second power lines may be stranded or twisted together with other covered wires to form the core 300.

In the multicore cable 30 illustrated in FIG. 3, the core 300 includes, as the plurality of covered wires 11, two power lines 12 forming the first power lines, two power lines 31 forming the second power lines, and the twisted pair signal wire 130. The two power lines 12, the two power lines 31, and the twisted pair signal wire 130 are stranded or twisted together.

Figure 4:
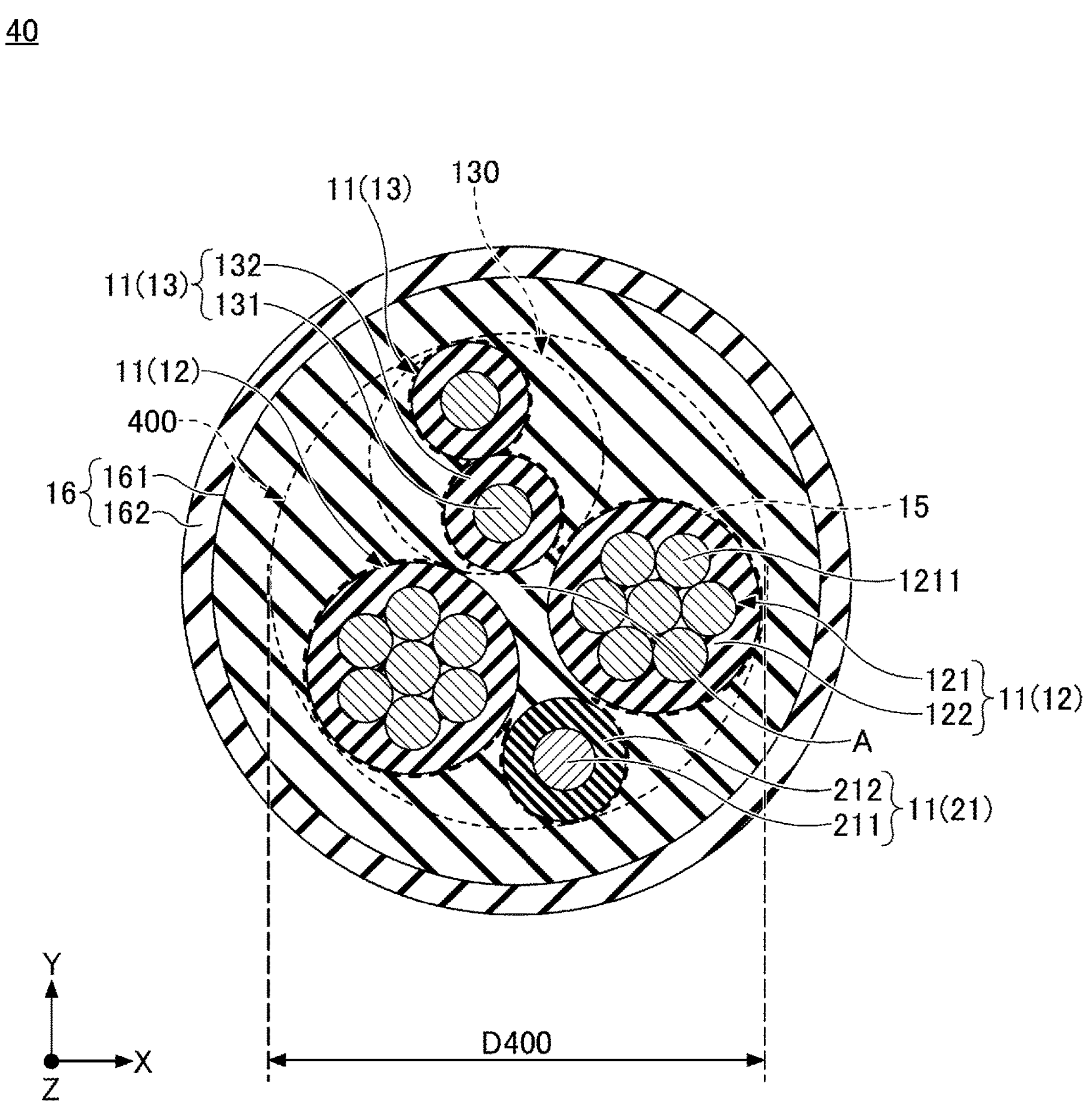
FIG. 4 is a cross sectional view of a fourth configuration example perpendicular to the longitudinal direction of the multicore cable according to one aspect of the present disclosure.

<Configuration of FIG. 4>

As in the multicore cable 40 illustrated in FIG. 4, the wire 21 can include a single wire, instead of the twisted pair cable 210. In the multicore cable 40 illustrated in FIG. 4, the core 400 includes the wire 21. Moreover, the two power lines 12, the twisted pair signal wire 130, and the wire 21 are stranded or twisted together.

<Others>

A twist pitch of the core is not particularly limited, but is preferably in a range that is 10 times or greater and 25 times or less than the outer diameter of the core, for example.

By setting the twist pitch of the core to a value 10 times or greater than the outer diameter of the core, it is possible to reduce an unevenness in a surface of the core, and to make a cross section perpendicular to the longitudinal direction of the multicore cable including the core closer to a perfect circle. In addition, by setting the twist pitch of the core to a value 25 times or less than the outer diameter of the core, it is possible to particularly improve a flexibility of the multicore cable including the core, and to exhibit excellent handling properties when performing wiring or the like.

The "outer diameter of the core" refers to a diameter of the core in the cross section perpendicular to the longitudinal direction of the multicore cable. The outer diameters of the cores 100, 200, 300, and 400 illustrated in FIG. 1 through FIG. 4 are denoted by D100, D200, D300, and D400, respectively. However, because the outer diameter of the core may vary slightly depending on the cross section that is measured, the outer diameter of the core is preferably an average value of the outer diameters that are measured for a plurality of cross sections.

Accordingly, the outer diameter of the core can be measured and computed by a procedure described in the following. A major axis length of the core is measured by a length measuring instrument, such as a micrometer or the like, for three measurement cross sections arranged along the longitudinal direction of the multicore cable. A distance between two mutually adjacent measurement cross sections is 1 m along the longitudinal direction of the multicore cable. An average value of the major axis lengths of the core measured for the three measurement cross sections can be determined as the outer diameter of the core of the multicore cable. Outer diameters of the twisted pair signal wire and the twisted pair cable, in which a plurality of covered wires are stranded or twisted together, can also be measured in a manner similar to the outer diameter of the core.

The "twist pitch of the core" refers to a length it takes for the covered wire forming the core to be twisted once. This "length" refers to a length along a center axis of the core. Because the twist pitch of the core can be measured in a manner similar to a twist pitch of the twisted pair signal wire that will be described later, a description on the measurement of the twist pitch of the core will be omitted.

(2) Each Member Included in Multicore Cable:

Next, each member included in the multicore cable will be described.

(2-1) Power Line:

For example, as illustrated in FIG. 1, the power line 12 includes a first conductor 121, and a first insulating layer 122 covering an outer surface of the first conductor 121. Similarly, the power line 31 illustrated in FIG. 3 includes a first conductor 311, and a first insulating layer 312 covering an outer surface of the first conductor 311.

The power line 12 and the power line 31 can be used to transmit power and control signals from an electronic control unit (ECU) of a vehicle, for example, to an outside of the vehicle. Such power lines can be used to control an electric parking brake (EPB), for example. The EPB includes a motor that drives a brake caliper. Further, such power lines can be used as a power supply line or a control line used in a damper control system for varying hydraulic characteristics of a suspension.

Although the power line 12 will be described in the following as an example, the power line 31 can also be configured in a manner similar to the power line 12.

(First Conductor)

The first conductor 121 may be foamed by stranding or twisting a plurality of element wires. A wire made of copper or a copper alloy can be used as the element wire. A wire made of a material having predetermined conductivity and flexibility, other than copper or the copper alloy, such as a tin-plated annealed copper wire, an annealed copper wire, or the like, for example, can also be used as the element wire. A hard-drawn copper wire can also be used as the element wire. A cross sectional area of the first conductor 121 is not particularly limited, but is preferably in a range greater than or equal to 1.0 $mm^2$ and less than or equal to 3.0 $mm^2$, for example. As illustrated in FIG. 1, the first conductor 121 can include a plurality of conductors 1211 that are respectively famed by a plurality of stranded or twisted element wires. In the case where the first conductor 121 includes the plurality of conductors 1211, it is preferable that a sum of cross sectional areas of the plurality of conductors 1211 satisfies the range described above. In the case of the power line 31 illustrated in FIG. 3, the first conductor 311 may also include a plurality of conductors 3111 respectively formed by a plurality of stranded or twisted element wires.

By setting the cross sectional area of the first conductor 121 to a value less than or equal to 3.0 $mm^2$, it is possible to reduce the cross sectional area of the power line 12, and also reduce the cross sectional area of the multicore cable 10. As a result, it is possible to reduce the outer diameter of the multicore cable 10, and make the multicore cable 10 thin.

In addition, by setting the cross sectional area of the first conductor 121 to a value greater than or equal to 1.0 $mm^2$, it is possible to reduce a resistance when supplying power.

(First Insulating Layer)

The first insulating layer 122 can include a composition including a resin material that is a synthetic resin, for example. The first insulating layer 122 can cover the first conductor 121 by being laminated on an outer periphery of the first conductor 121. An average thickness of the first insulating layer 122 is not particularly limited, but may be in a range greater than or equal to 0. 1 mm and less than or equal to 0. 5 mm, for example. The "average thickness" of the first insulating layer 122 refers to an average value of thicknesses measured at ten arbitrary points on the first insulating layer 122. In the following description, the "average thickness" of each member or the like will be defined in the same manner.

A resin forming a main component (or main component resin) of the first insulating layer 122, that is, the resin having a largest mass percent (mass %) in the first insulating layer 122 among materials forming the first insulating layer 122, is not particularly limited as long as the first insulating layer can exhibit insulating properties. However, from a viewpoint of improving the flexing resistance at low temperatures, the main component resin is preferably a copolymer of ethylene and α-olefin having a carbonyl group. A content of the α-olefin having the carbonyl group in the main component resin is preferably greater than or equal to 14 mass %, and more preferably greater than or equal to 15 mass %. Further, the content of the α-olefin having the carbonyl group is preferably less than or equal to 46 mass %, and more preferably less than or equal to 30 mass %. When the content of the α-olefin having the carbonyl group is greater than or equal to 14 mass %, the flexing resistance at the low temperatures can be particularly improved, which is preferable. When the content of the α-olefin having the carbonyl group is less than or equal to 46 mass %, mechanical properties such as a strength or the like of the first insulating layer 122 can be improved, which is preferable.

The α-olefin having the carbonyl group preferably includes one or more elements selected from alkyl (meth) acrylates such as methyl (meth) acrylate, ethyl (meth) acrylate, or the like; aryl (meth) acrylates such as phenyl (meth) acrylate or the like; vinyl esters such as vinyl acetate, vinyl propionate, or the like; unsaturated acids such as (meth) acrylic acid, crotonic acid, maleic acid, itaconic acid, or the like; vinyl ketones such as methyl vinyl ketone, phenyl vinyl ketone, or the like; (meth) acrylic acid amides or the like; or the like. Among these elements, one or more elements are preferably selected from (meth) acrylic acid alkyl esters and vinyl esters, and one or more elements are more preferably selected from ethyl acrylate and vinyl acetate.

Examples of the main component resin include resins such as ethylene-vinyl acetate copolymer (EVA), ethylene-ethyl acrylate copolymer (EEA), ethylene-methyl acrylate copolymer (EMA), ethylene-butyl acrylate copolymer (EBA), or the like, for example. Among these resins, one or more resins are preferably selected from EVA and EEA.

The first insulating layer 122 can include other resins other than the main component resin described above.

The content of the other resins in the resin material is preferably less than or equal to 60 mass %, more preferably less than or equal to 30 mass %, and still more preferably less than or equal to 10 mass %. Of course, the first insulating layer 122 may not include the other resins.

The resin material included in the first insulating layer 122 is not limited to the example described above, and for example, a resin material similar to that used for the second insulating layer 132 that will be described later may also be used for the first insulating layer 122.

The first insulating layer 122 can include additives, such as a flame retardant, a flame retardant assistant, an antioxidant, a lubricant, a coloring agent, a reflection imparting agent, a masking agent, a processing stabilizer, a plasticizer, or the like.

Examples of the flame retardant include halogen-based flame retardants, such as a bromine-based flame retardant, a chlorine-based flame retardant, or the like; non-halogen-based flame retardants, such as a metal hydroxide, a nitrogen-based flame retardant, a phosphorus-based flame retardant, or the like; or the like. A single kind of flame retardant may be used, or a combination of two or more kinds of flame retardants may be used.

Examples of the bromine-based flame retardant include decabromodiphenylethane or the like, for example. Examples of the chlorine-based flame retardant include chlorinated paraffin, chlorinated polyethylene, chlorinated polyphenol, perchloropentacyclodecane, or the like, for example. Examples of the metal hydroxide include magnesium hydroxide, aluminum hydroxide, or the like, for example. Examples of the nitrogen-based flame retardant include melamine cyanurate, triazine, isocyanurate, urea, guanidine, or the like, for example. Examples of the phosphorus-based flame retardant include metal phosphinate, phosphaphenanthrene, melamine phosphate, ammonium phosphate, phosphate ester, polyphosphazene, or the like, for example.

From a viewpoint of reducing environmental load, the flame retardant is preferably a non-halogen-based flame retardant, and more preferably a metal hydroxide, a nitrogen-based flame retardant, or a phosphorus-based flame retardant.

In a case where the first insulating layer 122 includes a flame retardant, a content of the flame retardant in the first insulating layer 122 is preferably greater than or equal to 10 parts by mass, and more preferably greater than or equal to 50 parts by mass, with respect to 100 parts by mass of the resin material. On the other hand, the content of the flame retardant is preferably less than or equal to 200 parts by mass, and more preferably less than or equal to 130 parts by mass, with respect to 100 parts by mass of the resin material. When the content of the flame retardant is greater than or equal to 10 parts by mass with respect to 100 parts by mass of the resin material, it is possible to obtain a particularly sufficient flame retardant effect. In addition, when the content of the flame retardant is less than or equal to 200 parts by mass with respect to 100 parts by mass of the resin material, it is possible to particularly easily perform extrusion molding of the first insulating layer 122, and to improve the mechanical properties, such as elongation, tensile strength, or the like.

The resin material of the first insulating layer 122 may or may not be crosslinked, but is preferably crosslinked. Examples of a method of crosslinking the resin material of the first insulating layer 122 include a method of irradiating ionizing radiation, a method of using a thermal crosslinking agent, a method of using a silane graftmer, or the like. Among such methods of crosslinking the resin material, the method of irradiating ionizing radiation is preferable. In order to promote the crosslinking, a silane coupling agent is preferably added to the composition forming the first insulating layer 122.

The first insulating layer 122 may have a configuration including a plurality of layers.

(Outer Diameter)

An outer diameter D12 of the power line 12 is not particularly limited, but is preferably in a range greater than or equal to 1.8 mm and less than or equal to 3.4 mm, for example. By setting the outer diameter D12 of the power line 12 to a value greater than or equal to 1.8 mm, a sufficiently large outer diameter D121 of the first conductors 121 and a sufficiently large thickness of the first insulating layer 122 can be ensured. In this case, it is possible to reduce the resistance when supplying power, and to improve a durability of the power line. By setting the outer diameter D12 of the power line 12 to a value less than or equal to 3.4 mm, it is possible to reduce the diameter of the power line 12, and to also reduce the diameter of the multicore cable. In this case, it is possible to improve the handling properties of the multicore cable when performing wiring or the like.

The outer diameter of the power line 12 can be measured in accordance with JIS C 3005 (2014). More particularly, the outer diameter of the power line can be measured at two or more locations on the same plane that is perpendicular (at right angles) to the center axis (wire axis) of the power line, and an average value of the measured outer diameters can be determined as the outer diameter of the power line.

When the outer diameter of the power line is measured at two or more locations on the same plane that is perpendicular to the center axis of the power line as described above, that is, within one cross section perpendicular to the center axis of the power line, the outer diameter is measured along the diameter of the power line. When making the measurement, it is preferable to select the measurement points so that angles between a plurality of diameters of the power line subjected to the measurement are approximately the same. More particularly, the outer diameter of the power line is measured along two diameters perpendicular to each other, on the plane that is perpendicular to the center axis of the power line to be measured, and the average value of the measured outer diameters can be determined as the outer diameter of the power line, for example. The outer diameters of the other covered wires, such as the signal wires, the wires, or the like, and the conductor of each covered wire, can also be measured in a similar manner.

(2-2) Signal Line & Twisted Pair Signal Line:

The signal wire 13 includes a second conductor 131, and a second insulating layer 132 covering an outer surface of the second conductor 131. An outer diameter D131 of the second conductor 131 is preferably smaller than the outer diameter D121 of the first conductor 121. As described above, two signal wires 13 can be stranded or twisted to form the twisted pair signal wire 130. The two signal wires 13 stranded or twisted together along the longitudinal direction may have the same size and be made of the same material.

(2-2-1) Signal Wire:

The signal wire 13 can be used to transmit a signal from a sensor, and to transmit the control signal from the ECU. The two signal wires 13 can be used for a wiring of an anti-lock brake system (ABS), for example. The two signal wires 13 can be used as wires for connecting a differential wheel speed sensor and the ECU of the vehicle, for example. The two signal wires 13 can be used to transmit other signals.

(Second Conductor)

The second conductor 131 may be formed by stranding or twisting a plurality of element wires. For example, as illustrated in FIG. 1, the second conductor 131 may be formed by a single conductor in which a plurality of element wires are stranded or twisted together, or by a plurality of such conductors.

More particularly, as in the case of the signal wire 13 illustrated in FIG. 1 or the like, for example, the second conductor 131 may be formed by a single conductor described above. Further, the second conductor 531 may be formed by a plurality of the conductors 5311, similar to the signal wire 53 of a twisted pair signal wire 530A illustrated in FIG. 5A. In the case of the signal wire 53 illustrated in FIG. 5A, the plurality of conductors 5311 forming the second conductor 531 are preferably stranded or twisted together. The twisted pair signal wire 530A and the signal wire 53 illustrated in FIG. 5A can be configured in a similar manner to the other twisted pair signal wire 130 and the signal wire 13, except for the different configuration of the second conductor 531. The twisted pair signal wire 530A may further include a second insulating layer 532 covering the second conductor 531, similar to the signal wire 13.

The second conductor 131 may be foiled of a material that is the same as, or is different from, the material used for the conductor foaming the first conductor 121 described above. A cross sectional area of the second conductor 131 is not particularly limited, but may be in a range greater than or equal to 0.13 $mm^2$ and less than or equal to 0.5 $mm^2$, for example. In the case where the second conductor 531 includes a plurality of conductors 5311 as in the case of the signal wire 53 illustrated in FIG. 5A described above, a sum of cross sectional areas of the plurality of conductors 5311 included in the second conductor 531 preferably satisfies the range described above.

(Second Insulating Layer)

A material used for the second insulating layer 132 is not particularly limited, but can include a resin material. Examples of the resin material include one or more resins selected from fluororesins such as polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer (ETFE), or the like; polyester resins such as polyethylene terephthalate (PET) or the like; polyolefin resins such as polyethylene, polypropylene, or the like; or the like, for example.

The resin material of the second insulating layer 132 may or may not be crosslinked, but is preferably crosslinked. Examples of a method of crosslinking the resin material of the second insulating layer 132 include the method of irradiating ionizing radiation, the method of using the thermal crosslinking agent, the method of using the silane graftmer, or the like. Among such methods of crosslinking the resin material, the method of irradiating the ionizing radiation is preferable. In addition, in order to promote the crosslinking, the silane coupling agent is preferably added to the composition forming the second insulating layer 132.

The second insulating layer 132 can further include additives such as the flame retardant, the flame retardant assistant, the antioxidant, the lubricant, the colorant, the reflection imparting agent, the masking agent, the processing stabilizer, the plasticizer, or the like.

(Outer Diameter)

An outer diameter D13 of the signal wire 13 is not particularly limited, but is preferably in a range greater than or equal to 1.00 mm and less than or equal to 2.20 mm, for example. By setting the outer diameter D13 of the signal wire 13 to a value greater than or equal to 1.00 mm, it is possible to particularly increase a bending rigidity (or flexural rigidity) of the signal wire 13, and to improve a processability when performing the wiring the signal wire 13. By setting the outer diameter D13 of the signal wire 13 to a value less than or equal to 2.20 mm, it is possible to reduce the diameter of the signal wire 13, and to also reduce the diameter of the multicore cable.

(2-2-2) Twisted Pair Signal Wire:

(Twist Pitch of Twisted Pair Signal Wire)

A twist pitch of the twisted pair signal wire 130 is not particularly limited, but is preferably in a range greater than or equal to 20 times and less than or equal to 80 times the outer diameter D13 of the signal wire 13, and more preferably in a range greater than or equal to 25 times and less than or equal to 70 times the outer diameter D13 of the signal wire 13, for example. By setting the twist pitch of the twisted pair signal wire 130 to a value greater than or equal to 20 times the outer diameter D13 of the signal wire 13, it is possible to reduce an unevenness in a surface of the twisted pair signal wire 130, and to facilitate the processing. In addition, by setting the twist pitch of the twisted pair signal wire 130 to a value less than or equal to 80 times the outer diameter D13 of the signal wire 13, it is possible to improve a signal quality of the signal transmitted by the twisted pair signal wire 130.

The twist pitch of the twisted pair signal wire 130 refers to a length it takes for the signal wires 13 forming the twisted pair signal wire 130 to be twisted once. This "length" refers to a length along a center axis of the twisted pair signal wire 130.

Figure 6:
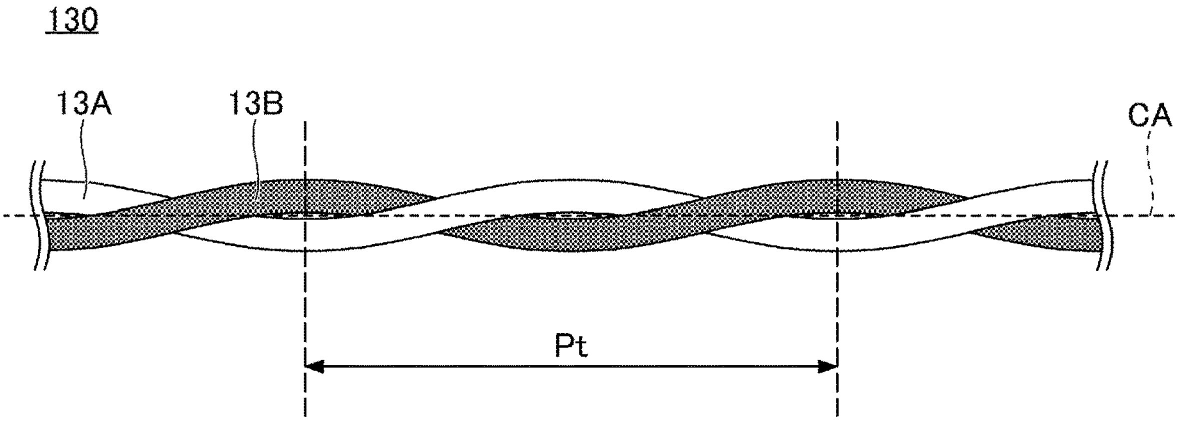
FIG. 6 is a diagram for explaining a twist pitch.

For the sake of convenience, one signal wire 13 forming the twisted pair signal wire 130 may also be referred to as a first signal wire 13A, and the other signal wire 13 forming the twisted pair signal wire 130 may also be referred to as a second signal wire 13B. FIG. 6 illustrates a side view of the twisted pair signal wire 130. The first signal wire 13A and the second signal wire 13B successively and repeatedly appear at a side surface of the twisted pair signal wire 130. Further, as illustrated in FIG. 6, for one cable at the side surface of the twisted pair signal wire 130, for example, a length of the second signal wire 13B twisted once along a center axis CA corresponds to a twist pitch Pt of the twisted pair signal wire 130.

The twist pitch can be measured by a method in accordance with JIS C 3002 (1992), for example. Although the twist pitch Pt of the twisted pair signal wire 130 is described above as an example, the twist pitch of the core or the like have a similar meaning, and can be evaluated in a manner similar to the twisted pair signal wire 130.

The outer diameter D130 of the twisted pair signal wire 130 can be approximately the same as the outer diameter D12 of the power line 12.

(Covering Layer)

Figure 5A:
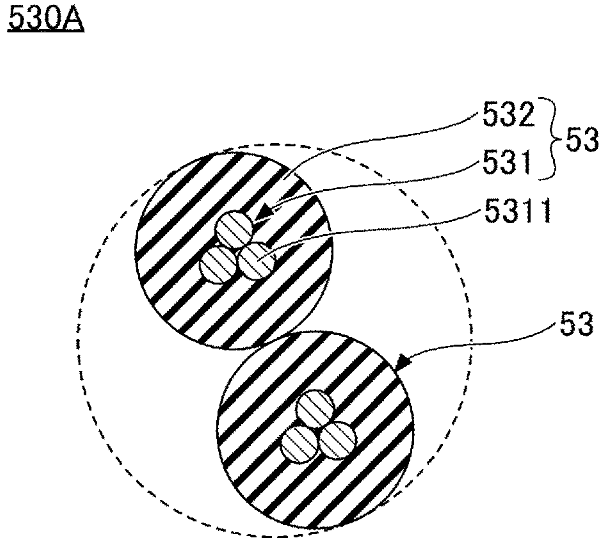
FIG. 5A is a diagram for explaining a configuration example of twisted pair signal wires included in the multicore cable according to one aspect of the present disclosure.
Figure 5B:
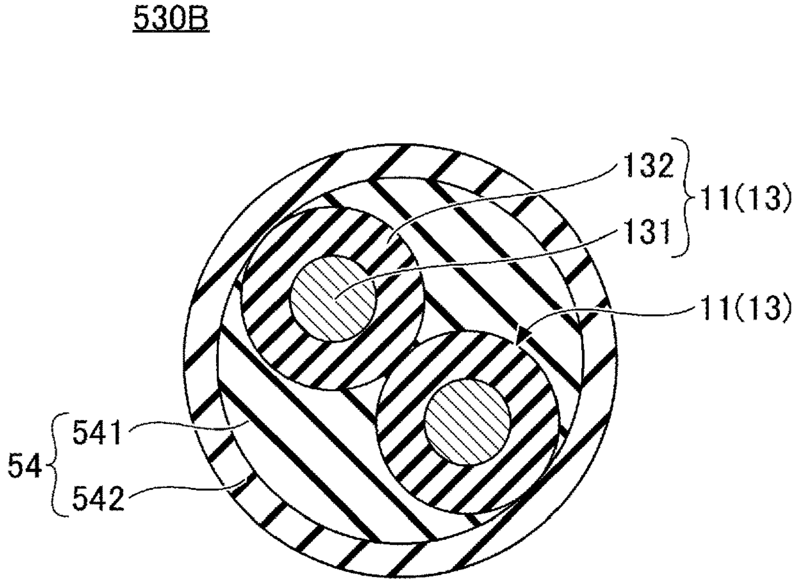
FIG. 5B is a diagram for explaining another configuration example of the twisted pair signal wires included in the multicore cable according to one aspect of the present disclosure.

The twisted pair signal wire may further include a covering layer 54 covering the two twisted signal wires 13, similar to a twisted pair signal wires 530B illustrated in FIG. 5B. The covering layer 54 may have a configuration including a single layer, or including two layers, namely, a first covering layer 541 and a second covering layer 542. As illustrated in FIG. 5B, the first covering layer 541 can be disposed to cover the outer peripheries of the two signal wires 13, and the second covering layer 542 can be disposed to cover an outer surface of the first covering layer 541.

The material of the covering layer 54 is not particularly limited. For example, the covering layer 54 may be formed of a material that is the same as, or is different from, the material used for the second insulating layer 132.

One or more resins selected from thermoplastic polyurethane elastomer, ethylene-vinyl acetate copolymer (EVA), ethylene-ethyl acrylate copolymer (EEA), or the like, for example, can be suitably used for the material of the first covering layer 541. A thermoplastic polyurethane elastomer or the like, for example, can be suitably used for the material of the second covering layer 542.

The covering layer 54 may be formed by winding a tape, or may be a resin tube formed by extrusion molding.

(2-3) Wire & Twisted Pair Cable:

As illustrated in the multicore cable 20 of FIG. 2, the multicore cable of the present embodiment can include the twisted pair cable 210 in which two wires 21 are stranded or twisted together. Further, as illustrated in the multicore cable 40 of FIG. 4, the multicore cable of the present embodiment can include a single wire 21.

The wire 21 can include a third conductor 211, and a third insulating layer 212 covering an outer surface of the third conductor 211. An outer diameter D211 of the third conductor 211 is preferably smaller than the outer diameter D121 of the first conductor 121 (refer to FIG. 1). The outer diameter, the material, or the like of the wire 21 may be the same as those of the signal wire 13.

(2-3-1) Wire:

The wire 21 can be used to transmit the signal from the sensor, transmit the control signal from the ECU, and used as a power supply line or the like for supplying power to an electronic device. The wire 21 can also be used as a ground wire.

The third conductor 211 may be formed by stranding or twisting a plurality of element wires. As illustrated in FIG. 2, for example, the third conductor 211 can include a single conductor famed by stranding or twisting a plurality of element wires, or can include a plurality of such conductors. In a case where the third conductor 211 includes a plurality of conductors, the plurality of conductors are preferably stranded or twisted together.

The third conductor 211 may be formed of a material that is the same as, or is different from, the material used for the conductor forming the first conductor 121 or the second conductor 131 described above. A cross sectional area of the third conductor 211 is not particularly limited, but may be in a range greater than or equal to 0.13 $mm^2$ and less than or equal to 0.5 $mm^2$, for example. In the case where the third conductor 211 includes a plurality of conductors, a sum of cross sectional areas of the plurality of conductors included in the third conductor 211 preferably satisfies the range described above.

(Third Insulating Layer)

A material used for the third insulating layer 212 is not particularly limited, but can include a resin material similar to that described above for the second insulating layer 132, for example. The third insulating layer 212 can include various additives, as required. The resin material or the like that can be suitably used for the third insulating layer 212 was described above for the second insulating layer 132, and thus, a description thereof will be omitted.

(Outer Diameter)

An outer diameter D21 of the wire 21 is not particularly limited, but is preferably in a range greater than or equal to 1.00 mm and less than or equal to 2.20 mm, for example. By setting the outer diameter D21 of the wire 21 to a value greater than or equal to 1.00 mm, it is possible to particularly increase a bending rigidity (or flexural rigidity) of the wire 21, and to improve a processability when performing the wiring the wire 21. By setting the outer diameter D21 of the wire 21 to a value less than or equal to 2.20 mm, it is possible to reduce the diameter of the wire 21, and to also reduce the diameter of the multicore cable.

(2-3-2) Twisted Pair Cable (Twist Pitch of Twisted Pair Cable)

A twist pitch of the two wires 21 of the twisted pair cable 210 is not particularly limited, but is preferably in a range greater than or equal to 20 times and less than or equal to 70 times the outer diameter D21 of the wire 21, and more preferably in a range greater than or equal to 25 times and less than or equal to 66 times the outer diameter D21 of the wire 21, for example. By setting the twist pitch of the twisted pair cable 210 to a value greater than or equal to 20 times the outer diameter D21 of the wire 21, it is possible to reduce an unevenness in a surface of the twisted pair cable 210, and to facilitate the processing. In addition, by setting the twist pitch of the twisted pair cable to a value less than or equal to 70 times the outer diameter D21 of the wire 21, it is possible to improve a signal quality of the signal transmitted by the twisted pair cable 210. Moreover, it is possible to improve a flexibility of the twisted pair cable 210.

An outer diameter D210 of the twisted pair cable 210 can be approximately the same as the outer diameter D12 of the power line 12.

(2-4) Size of Each Portion

The size or the like of the covered wire included in the multicore cable can be selected according to the configuration, use, or the like of the multicore cable, and are not particularly limited. However, the following relationship is preferably satisfied.

In the multicore cable including the power line 12 and the twisted pair signal wire 130, as in the multicore cables illustrated in FIG. 1 through FIG. 4, the following relationship is preferably satisfied. The outer diameter D12 of the power line 12 is preferably approximately the same as the outer diameter D130 of the twisted pair signal wire 130. Further, the outer diameter D12 of the power line 12 is preferably larger than the outer diameter D13 of the signal wire 13.

In the case where the multicore cable includes two types of power lines having different outer diameters, as in the multicore cable 30 illustrated in FIG. 3, the following relationship is preferably satisfied.

The outer diameter D31 of the power line 31, that is the second power line, is preferably smaller than the outer diameter D12 of the power line 12, that is the first power line. In addition, the outer diameter D31 of the power line 31, that is the second power line, is preferably smaller than the outer diameter D130 of the twisted pair signal wire 130 and larger than the outer diameter D13 of the signal wire 13.

The outer diameter D311 of the first conductor 311 of the power line 31, that is the second power line, is preferably smaller than the outer diameter D121 of the first conductor 121 of the power line 12, that is the first power line. Further, the outer diameter D311 of the first conductor 311 of the power line 31, that is the second power line, is preferably larger than the outer diameter D131 of the second conductor 131 of the signal wire 13.

In the case where the multicore cable includes the wire, as in the multicore cable 40 illustrated in FIG. 4, the following relationship is preferably satisfied. The outer diameter D21 of the wire 21 is preferably smaller than the outer diameter D12 of the power line 12. The outer diameter D21 of the wire 21 may be the same as, or be different from, the outer diameter D13 of the signal wire 13.

The outer diameter D211 of the third conductor 211 included in the wire 21 is preferably smaller than the outer diameter D121 of the first conductor 121 included in the power line 12. The outer diameter D211 of the third conductor 211 may be the same as the outer diameter D131 of the second conductor 131.

(3) Outer Sheath Layer:

The multicore cable according to the present embodiment can include the outer sheath layer 16 covering the outer surface of the core. In this case, the outer sheath layer 16 can be disposed so as to cover the core in its entirety, and completely cover the core.

A material used for the outer sheath layer 16 is not particularly limited, and can be formed of a polyolefin-based resin, such as polyethylene, ethylene-vinyl acetate copolymer (EVA), or the like; a polyurethane elastomer (polyurethane resin); a polyester elastomer; a composition including a mixture of at least two of such resins; or the like, for example.

Examples of the polyethylene include "Solumer (registered trademark)" (manufactured by SK Global Chemical Co., Ltd.) that is commercially available, and examples of the EVA include "Evaflex (registered trademark)" (manufactured by DuPont-Mitsui Polychemicals Co., Ltd.) that is commercially available. The polyolefin-based resin can be appropriately selected from various grades of commercially available products and used.

Examples of the material used for the outer sheath layer 16 also include crosslinked or non-crosslinked thermoplastic polyurethane (TPU) having excellent abrasion resistance properties (or hard wearing properties). Crosslinked thermoplastic polyurethane can be suitably used as the material of the outer sheath layer 16 because of excellent heat resistance properties exhibited thereby. Examples of the thermoplastic polyurethane include "Elastollan (registered trademark)" (manufactured by BASF SE) that is commercially available, "Miractran (registered trademark)" (manufactured by Tosoh Corporation) that is commercially available, or the like, for example. The thermoplastic polyurethane can be appropriately selected from various grades of commercially available products and used.

The outer sheath layer 16 can include various additives, as required. Examples of the additives can include inorganic substances, such as flame retardants or the like, for example. In a case where the inorganic substance, such as the flame retardant or the like, is mixed into the resin material of the outer sheath layer 16, a mixing ratio thereof is not particularly limited. For example, the inorganic substance, such as the flame retardant or the like, is preferably added to amount to 12 parts by mass or less, and more preferably 10 parts by mass or less, with respect to 100 parts by mass of the resin material, for example.

Examples of the inorganic substance to be added include one or more kinds of elements selected from antimony trioxide, aluminum hydroxide, magnesium hydroxide, and talc, for example.

The outer sheath layer 16 can include a first outer sheath layer 161 disposed on the side of the plurality of covered wires 11, and a second outer sheath layer 162 covering an outer surface of the first outer sheath layer 161. In this case, the first outer sheath layer 161 may be formed of a material that is the same as, or is different from, the material used for the second outer sheath layer 162.

By employing a configuration in which the outer sheath layer 16 includes a plurality of layers, properties such as an elastic modulus or the like can be selected for each layer of the outer sheath layer 16, and properties such as adhesion between the outer sheath layer 16 and the plurality of covered wires 11, a flexing resistance of the multicore cable, or the like can easily be adjusted and selected.

The materials used for the first outer sheath layer 161 and the second outer sheath layer 162 are not particularly limited, and the materials described above for the outer sheath layer 16 can be used therefor, for example.

One or more kinds of resins selected from polyurethane resins and polyolefin-based resins can be suitably used as the material of the first outer sheath layer 161.

A polyurethane resin having excellent abrasion resistance properties can be suitably used as the material of the second outer sheath layer 162. Because the second outer sheath layer 162 is disposed on the outer side of the multicore cable, it is possible to particularly improve the durability of the multicore cable by using the polyurethane resin as the material of the second outer sheath layer 162.

Each of the first outer sheath layer 161 and the second outer sheath layer 162 can contain the inorganic substance described above.

The material of the outer sheath layer 16, such as the material of the first outer sheath layer 161, for example, can fill at least a portion of a region A surrounded by the plurality of covered wires 11. However, the region A may include a portion not filled with the material of the outer sheath layer 16 and forming a gap.

(4) Lubricant Powder:

The multicore cable 10 of the present embodiment can include the lubricant powder 15 disposed on the surfaces of the plurality of covered wires 11. The lubricant powder 15 may be disposed on the entire surfaced of the plurality of covered wires 11. However, the lubricant powder 15 may be disposed only on the outer surface of the core 100, for example, and not disposed on an inner surface side of the core 100.

The outer surfaces of the plurality of covered wires 11, and the outer sheath layer 16, can make contact with one another via the lubricant powder 15. That is, it is possible to employ a configuration in which no wrapping or the like is disposed between the outer sheath layer 16 and the plurality of covered wires 11. For this reason, at portions where the plurality of covered wires 11 and the outer sheath layer 16 make contact with one another via the lubricant powder 15, a structure is formed in which the plurality of covered wires 11, the lubricant powder 15, and the outer sheath layer 16 are successively laminated in this order. The lubricant powder 15 does not need to completely cover the outer surfaces of the plurality of covered wires 11. For this reason, a portion of the outer surfaces of the plurality of covered wires 11 may make direct contact with the outer sheath layer 16.

By employing the configuration in which the outer surfaces of the plurality of covered wires 11 and the outer sheath layer 16 make contact with one another via the lubricant powder 15, it is possible to reduce water entering inside the multicore cable 10, when compared to the case where a wrapping or the like is disposed on the outer surfaces of the plurality of covered wires 11.

A material used for the lubricant powder 15 is not particularly limited, however, the lubricant powder 15 can include talc, for example. The lubricant powder 15 can also be formed of talc.

When the lubricant powder 15 includes talc, it is possible to particularly improve the stripping properties of the outer sheath layer 16.

A coverage of the outer surfaces of the plurality of covered wires 11 by the lubricant powder 15 is not particularly limited, but is preferably greater than or equal to 15%, more preferably greater than or equal to 25%, and even more preferably greater than or equal to 30%.

The outer sheath layer 16 can easily be stripped off from the plurality of covered wires 11, by disposing the lubricant powder 15 on the outer surfaces of the plurality of covered wires 11, and setting the coverage of the outer surfaces of the plurality of covered wires 11 by the lubricant powder 15 to a value greater than or equal to 15%. For this reason, at the end portion of the multicore cable, for example, the outer sheath layer can easily be removed using a wire stripper, and a multicore cable having excellent stripping properties and processability can be obtained. Further, by setting the coverage to the value greater than or equal to 15%, it is possible to reduce a force applied to the plurality of covered wires from the outer sheath layer when the multicore cable is bent, and also improve the flexing resistance.

In the present specification, the stripping properties refer to the ease with which the outer sheath layer can be stripped off from the plurality of covered wires. Further, the processability refers to the ease with which the end portion of the multicore cable can be processed, which means that the outer sheath layer can easily be stripped off, for example.

By setting the coverage to a value greater than or equal to 25%, it is possible to particularly improve the stripping properties, the processability, and the flexing resistance.

An upper limit of the coverage of the outer surfaces of the plurality of covered wires 11 by the lubricant powder 15 is not particularly limited, and the coverage can be less than or equal to 100%, because the outer surfaces of the plurality of covered wires 11 may be completely covered by the lubricant powder 15.

However, in a case where the coverage of the outer surfaces of the plurality of covered wires 11 by the lubricant powder 15 is too large, the lubricant powder 15 may scatter to the surrounding when a portion of the outer sheath layer 16 is removed at an end portion of the multicore cable 10 in order to connect the multicore cable 10 to a device or the like. For this reason, the coverage of the outer surfaces of the plurality of covered wires 11 by the lubricant powder 15 is preferably less than or equal to 70%, and more preferably less than or equal to 60%. By setting the coverage of the outer surfaces of the plurality of covered wires 11 to a value less than or equal to 70%, the scattering of the lubricant powder 15 to the surrounding can be sufficiently reduced when the portion of the outer sheath layer 16 is removed at the end portion of the multicore cable 10 in order to connect the multicore cable 10 to the device or the like.

The coverage of the outer surfaces of the plurality of covered wires 11 by the lubricant powder 15 can be computed by the following procedure, for example.

Figure 7A:
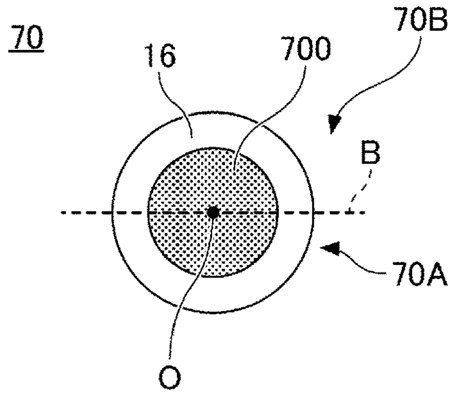
FIG. 7A is a diagram for explaining a method for evaluating a coverage of outer surfaces of a plurality of covered wires by a lubricant powder.

First, as illustrated in FIG. 7A, a multicore cable 70 to be evaluated can be divided into two parts by a plane passing through a center axis, that is, the plane including a center O of an end surface of the multicore cable 70 along the longitudinal direction. In the case of the multicore cable 70 illustrated in FIG. 7A, the multicore cable 70 is divided into two parts along a straight line B, that is, into a first member 70A and a second member 70B.

Figure 7B:
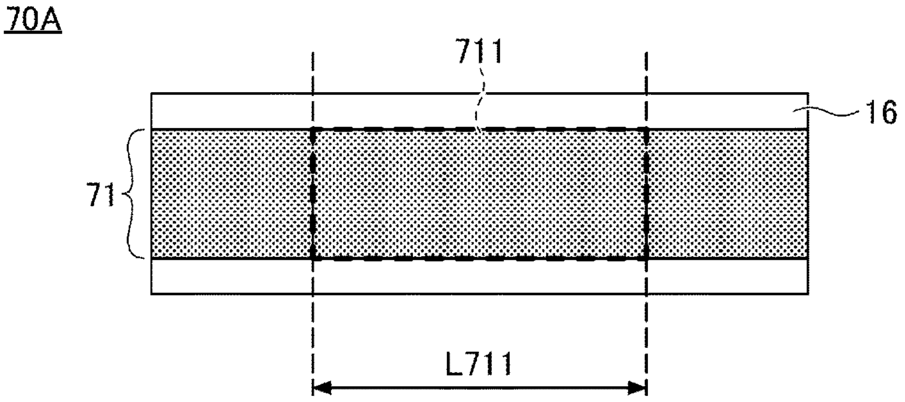
FIG. 7B is a diagram for explaining the method for evaluating the coverage of the outer surfaces of the plurality of covered wires by the lubricant powder.

With respect to the first member 70A, a parting face after a core 700 is removed is illustrated in FIG. 7B. The first member 70A, after the core 700 is removed, is formed by the outer sheath layer 16, and the lubricant powder is adhered inside a region 71 from which the core 700 is removed. Further, it is possible to compute an area ratio of the lubricant powder occupying a measurement region 711 that is selected so that a width L711 becomes equal to the length of the twist pitch of the core 700, inside the region 71 from which the core 700 is removed. The area ratio of the lubricant powder occupying the measurement region 711 can be obtained, for example, by capturing an image of the measurement region 711 by an imaging device such as a camera or the like, binarizing the captured image, computing an area of a region corresponding to the lubricant powder, and dividing the computed area by an area of the measurement region 711.

With respect to the multicore cables to be evaluated, the evaluation described above is preferably made for five or more samples, and an average value of the evaluation results of the evaluated samples is determined as the coverage of the outer surfaces of the plurality of covered wires 11 by the lubricant powder 15 in the multicore cable. An upper limit of the number of samples to be evaluated is not particularly limited, but is preferably less than or equal to 50 samples when taking into consideration an evaluation efficiency or the like.

Although the embodiments are described above in detail, the present invention is not limited to specific embodiments, and various variations, modifications, and substitutions may be made within the scope of the present invention recited in the claims, for example.

[Exemplary Implementations]

The present invention will be described in the following with reference to exemplary implementations, but the present invention is not limited to these exemplary implementations.

(Evaluation Method)

First, an evaluation method of the multicore cable manufactured in the following experimental examples will be described.

(1) Length of Each Part:

(1-1) Outer Diameter of Conductor & Covered Wire:

The outer diameters of the conductor and the covered wire are measured in accordance with JIS C 3005 (2014). More particularly, the outer diameter is measured along two mutually perpendicular diameters on a plane perpendicular to the center axis of the conductor or the covered wire, and the average value of the measured diameters is determined as the outer diameter of the conductor or the covered wire.

(1-2) Outer Diameter of Core:

The outer diameter of the core is measured and computed by the following procedure. In three measurement cross sections arranged along the longitudinal direction of the multicore cable, the major axis length of the core is measured by the micrometer. The distance between two mutually adjacent measurement cross sections is 1 m along the longitudinal direction of the multicore cable. The average value of the major axis lengths of the core measured for the three measurement cross sections is determined as the outer diameter of the core of the multicore cable.

(2) Coverage:

The coverage of the outer surfaces of the plurality of covered wires 11 by the lubricant powder 15 is computed by the following procedure.

First, as illustrated in FIG. 7A, the multicore cable 70 to be evaluated is divided into two by the plane passing through the center axis, that is, the plane including the center O of the end surface along the longitudinal direction. In the case of the multicore cable 70 illustrated in FIG. 7A, the multicore cable 70 is divided into two parts along the straight line B, that is, into the first member 70A and the second member 70B.

With respect to the first member 70A, the parting face after the core 700 is removed is illustrated in FIG. 7B. The first member 70A, after the core 700 is removed, is formed by the outer sheath layer 16, and the lubricant powder is adhered inside the region 71 from which the core 700 is removed. Further, the area ratio of the lubricant powder occupying the measurement region 711 that is selected so that the width L711 becomes equal to the length of the twist pitch of the core 700, inside the region 71 from which the core 700 is removed, is computed. The area ratio of the lubricant powder occupying the measurement region 711 is obtained by capturing the image of the measurement region 711 by the imaging device, binarizing the captured image, computing the area of the region corresponding to the lubricant powder, and dividing the computed area by the area of the measurement region 711.

The evaluation described above is performed for 10 samples, with respect to the multicore cable of the same experimental example, and an average value of the evaluation results for the 10 samples is determined as the coverage of the outer surfaces of the plurality of covered wires 11 by the lubricant powder 15 in the multicore cable of the experimental example. The evaluation results are illustrated in a column labeled "coverage" in Table 1.

(3) Adhesion Test:

The adhesion is evaluated according to JASO D 625-2. More particularly, the adhesion is measured using a measurement jig 81 provided with a through hole enabling only a core 800, that is, the plurality of covered wires illustrated in FIG. 8, to pass through. The adhesion refers to an adhesion between the core and the outer sheath layer.

First, the outer sheath layer 16 of a multicore cable 80 to be evaluated is removed, except for a portion thereof, to expose the core 800. In this state, as illustrated in FIG. 8, the core 800 is exposed so that a portion of the outer sheath layer 16, remaining along the longitudinal direction of the multicore cable 80, has a length L80 of 50 mm.

Then, the exposed core 800 is inserted into the through hole of the measurement jig 81. Hence, as illustrated in FIG. 8, the multicore cable 80 is set on the measurement jig 81.

Figure 8:
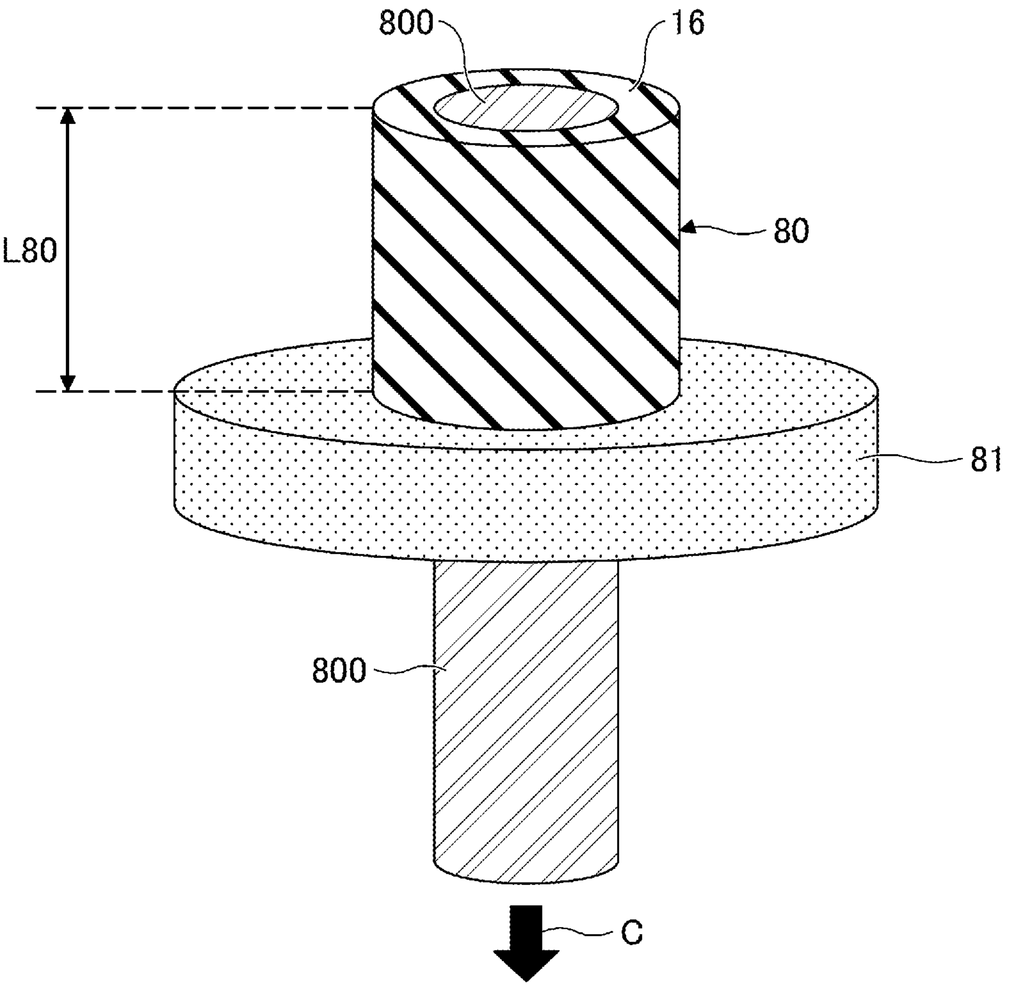
FIG. 8 is a diagram for explaining a method for evaluating adhesion in an experimental example.

Next, the multicore cable 80 is pulled in a direction of an arrow C in FIG. 8 at a speed of 250 mm/min, in a state where the measurement jig 81 is fixed. Further, the outer sheath layer 16 is stripped off from the core 800, and a magnitude of a force, that is applied when the core 800 passes through the through hole of the measurement jig 81 and moves below the measurement jig 81, is measured. The magnitude of the measured force is determined as the adhesion per length of 50 mm of the outer sheath layer 16.

The evaluation described above is performed for 10 samples, with respect to the multicore cable of the same experimental example, and an average value of the evaluation results for the 10 samples is determined as the adhesion of the multicore cable of the experimental example. The evaluation results are illustrated in a column labeled "adhesion" in Table 1.

In a case where the adhesion is less than or equal to 100 N, the outer sheath layer can easily be stripped off from the plurality of covered wires, meaning that the multicore cable has excellent stripping properties.

(4) Processability:

(4-1) Evaluation E1:

At the end portion of the multicore cable manufactured for each experimental example, the wire stripper is used to pull with a constant force, so as to attempt stripping off a length of 50 mm of the outer sheath layer. 0 point is given for a case where the outer sheath layer cannot be stripped off to the length of 50 mm, and 1 point is given for a case where the outer sheath layer can be stripped off to the length of 50 mm.

Then, the evaluation described above is performed for 10 samples, with respect to the multicore cable of the same experimental example. With respect to the evaluation E1, the evaluation result is A when a sum of the evaluation results for the 10 samples is in a range greater than or equal to 7 points and less than or equal to 10 points, B when the sum of the evaluation results for the 10 samples is in a range greater than or equal to 3 points and less than or equal to 6 points, and C when the sum of the evaluation results for the 10 samples is less than or equal to 2 points.

In a case where the evaluation result of the evaluation E1 is A, it is indicated that the outer sheath layer can easily be stripped off from the plurality of covered wires, that is, the multicore cable has excellent stripping properties and processability. Compared to the evaluation result A, the stripping properties deteriorate in the case of the evaluation result B, and further deteriorate in the case of the evaluation result C.

(4-2) Evaluation E2:

At the end portion of the multicore cable manufactured for each experimental example, the length of 50 mm of the outer sheath layer is stripped off using the wire stripper. In this state, 0 point is given for a case where the insulating layer extends in the longitudinal direction, and a difference greater than or equal to 1 mm is generated between the tip end of the conductor and the tip end of the insulating layer, in the covered wire forming the core. 0 point is also given for a case where the outer sheath layer cannot be stripped off. 1 point is given for a case where no difference is generated between the tip ends of the conductor and the insulating layer, or the difference is less than 1 mm, in all of the covered wires forming the core.

Then, the evaluation described above is performed for 10 samples, with respect to the multicore cable of the same experimental example. With respect to the evaluation E2, the evaluation result is A when a sum of the evaluation results for the 10 samples is in a range greater than or equal to 7 points and less than or equal to 10 points, B when the sum of the evaluation results for the 10 samples is in a range greater than or equal to 3 points and less than or equal to 6 points, and C when the sum of the evaluation results for the 10 samples is less than or equal to 2 points.

In a case where the evaluation result of the evaluation E2 is A, it is indicated that the multicore cable, after stripping off the outer sheath layer, can be attached with ease to a peripheral component for connection to a device or the like. Compared to the evaluation result A, the attaching ease of the multicore cable deteriorates in the case of the evaluation result B, and further deteriorates in the case of the evaluation result C.

(4-3) Evaluation E3:

At the end portion of the multicore cable manufactured for each experimental example, the length of 50 mm of the outer sheath layer is stripped off using the wire stripper. In this state, 0 point is given for a case where a total amount of the lubricant powder, including the lubricant powder scattered to the surrounding, and the lubricant powder adhered to the outer sheath layer and the core and falling off when a fingertip hits these members, is greater than or equal to 0.01 g. 1 point is given for a case where the total amount of the lubricant powder is less than 0.01 g. In this evaluation E3, in a case where the outer sheath layer cannot be stripped off, the outer sheath layer is split and stripped off using a razor or the like.

Then, the evaluation described above is performed for 10 samples, with respect to the multicore cable of the same experimental example. With respect to the evaluation E3, the evaluation result is A when a sum of the evaluation results for the 10 samples is in a range greater than or equal to 7 points and less than or equal to 10 points, B when the sum of the evaluation results for the 10 samples is in a range greater than or equal to 3 points and less than or equal to 6 points, and C when the sum of the evaluation results for the 10 samples is less than or equal to 2 points.

In a case where the evaluation result of the evaluation E3 is A, it is indicated that the lubricant powder is hardly scattered to the surrounding when the outer sheath layer is stripped off, that is, the multicore cable has excellent processability. Compared to the evaluation result A, the processability deteriorates in the case of the evaluation result B, and further deteriorates in the case of the evaluation result C.

(5) Flexing Resistance Test:

A flexing resistance test is performed by a method in accordance with JIS C 6851 (2006) (optical fiber characteristic test method) with respect to the multicore cable manufactured in the following experimental examples.

Figure 9:
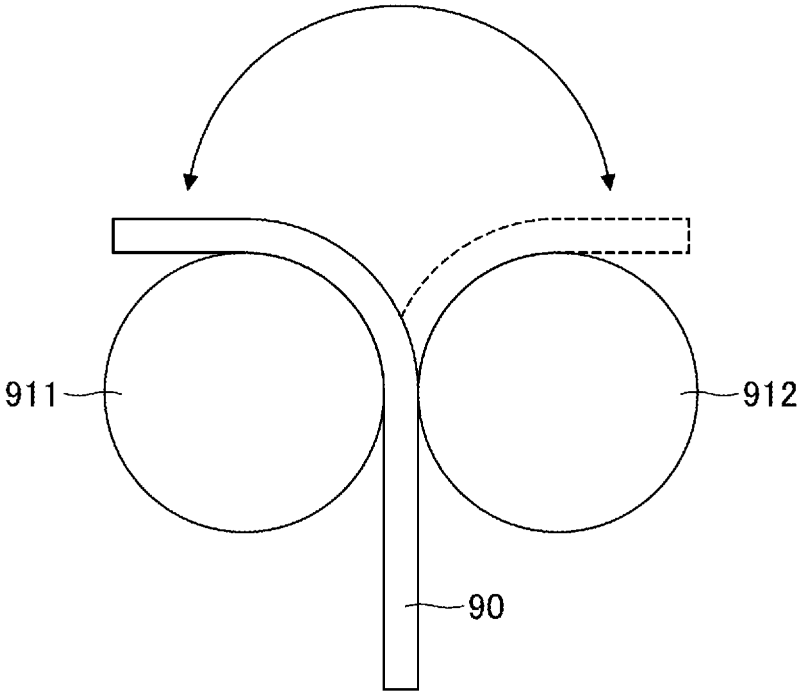
FIG. 9 is a diagram for explaining a flexing resistance test in an experimental example.

More particularly, as illustrated in FIG. 9, the multicore cable 90 to be evaluated is disposed in a vertical direction and sandwiched between two mandrels, namely, a first mandrel 911 and a second mandrel 912 respectively having a diameter of 60 mm and disposed parallel to each other along a horizontal direction. Next, a process of bending the upper end of the multicore cable 90 counterclockwise by 90° toward the horizontal direction from a vertical, neutral position so as to make contact with an upper side of the first mandrel 911, thereafter bending the upper end of the multicore cable 90 clockwise by 90° toward the horizontal direction from the neutral position so as to make contact with an upper side of the second mandrel 912, and finally bending the upper end of the multicore cable 90 counterclockwise by 90° to return to the neutral position, is repeated in a thermostatic chamber at a temperature of −30° C. This process is repeated while measuring all of resistance values of the two power lines 12 and the two signal wires 13 with respect to the multicore cable 10 of FIG. 1 manufactured in the following experimental examples, and determining, as an index value of the flexing resistance test, the number of times the process is repeated by the time the resistance increases to a value greater than or equal to 10 times an initial resistance value. The number of times bent, to be evaluated in the flexing resistance test, may be determined by counting one bend when the multicore cable 90 is bent from the neutral position to the left side in FIG. 9 making contact with the first mandrel 911, bent back to the neutral position, bent to the right side making contact with the second mandrel 912, and then bent back to the neutral position, such that the multicore cable 90 is bent by an angle amounting to 360° in total, for example. Of course, the number of times bent may be counted, by starting from the state where the multicore cable 90 is already bent to the left or right side, until the multicore cable 90 is bent back to the left or right side after being bent once to the right or left side.

The larger the index value of the flexing resistance test, that is, the larger the number of times the multicore cable is bent, the better the flexing resistance becomes.

With respect to the flexing resistance test, the evaluation result of the flexing resistance is A when the number of times bent is greater than or equal to 6,000,000 times, B when the number of times bent is in a range greater than or equal to 4,000,000 times and less than 6,000,000 times, and C when the number of times bent is less than 4,000,000 times.

In a case where the evaluation result of the flexing resistance is A, it is indicated that the multicore cable has an excellent flexing resistance. Compared to the evaluation result A, the evaluation result of the flexing resistance deteriorates in the case of the evaluation result B, and further deteriorates in the case of the evaluation result C. In other words, the flexing resistance is the highest in the case of the evaluation result A, among the evaluation results A through C of the flexing resistance.

(6) Evaluation:

An overall evaluation is determined from the evaluations E1 through E3 of the processability, and the evaluation results of the flexing resistance. 2 evaluation points are given in the case of the evaluation result A, 1 evaluation point is given in the case of the evaluation result B, and 0 evaluation point is given in the case of the evaluation result C, with respect to each of the evaluations E1 through E3 of the processability, and the evaluation results of the flexing resistance. The evaluation results of the overall evaluation are illustrated in a column simply labeled "evaluation" in Table 1.

The evaluation result of the overall evaluation is A when a total of the evaluation points for the evaluations E1 through E3 of the processability and the evaluation result of the flexing resistance is 8 points, B when the total of the evaluation points is in a range greater than or equal to 5 points and less than or equal to 7 points, and C when the total of the evaluation points is less than or equal to 4 points.

In a case where the evaluation result of the overall evaluation is A, it is indicated that the multicore cable has excellent stripping properties, processability, and flexing resistance. Compared to the evaluation result A, the overall evaluation deteriorates in the case of the evaluation result B, and further deteriorates in the case of the evaluation result C. In other words, the overall evaluation is the highest in the case of the evaluation result A, among the evaluation results A through C of the overall evaluation.

(Experimental Examples)

Hereinafter, the experimental examples will be described. Experimental examples EI3 through EI9 are exemplary implementations, and experimental examples EI1 and EI2 are comparative examples.

[Experimental Example EI1]

The multicore cable 10 illustrated in FIG. 1 is manufactured and evaluated. The manufactured multicore cable 10 includes, as the covered wires 11, two power lines 12, and a twisted pair signal wire 130 including two signal wires 13. The power lines 12 and the twisted pair signal wire 130 are stranded or twisted together to form the core 100.

The power line 12 includes the first conductor 121 that is formed by stranding or twisting together seven conductors 1211. The conductors 1211 are formed by 50 copper alloy wires that are stranded or twisted together, and the outer diameter D121 of the first conductor 121 is 2.0 mm, while the cross sectional area of the first conductor 121 is 1.8 $mm^2$. Crosslinked polyethylene is used for the first insulating layer 122. The outer diameter D12 of the power line 12 is 2.6 mm.

The twisted pair signal wire 130 is formed by stranding or twisting together two signal wires 13 including the second conductor 131, respectively. The second conductor 131 is famed by stranding or twisting together 40 copper alloy wires, and the outer diameter D131 of the second conductor 131 is 0.58 mm, while the cross sectional area of the second conductor 131 is 0.2 $mm^2$. Crosslinked polyethylene is used for the second insulating layer 132. The outer diameter D13 of the signal wire 13 is 1.4 mm.

The core 100 is formed by stranding or twisting together the two power lines 12 and the twisted pair signal wire 130 described above along the longitudinal direction. The outer diameter D100 of the core is 5.8 mm. The lubricant powder 15, that is talc, is coated on the outer surface of the core 100. For this reason, the lubricant powder 15 is disposed on the surfaces of the plurality of covered wires 11.

The outer sheath layer 16 is disposed so as to cover the outer surface of the core 100 that is formed by the plurality of covered wires 11. The outer sheath layer 16 and the outer surfaces of the plurality of covered wires 11 make contact with one another, via the lubricant powder 15.

The outer sheath layer 16 is formed by the first outer sheath layer 161 made of crosslinked polyethylene, and the second outer sheath layer 162 made of crosslinked polyurethane and disposed so as to cover the outer surface of the first outer sheath layer 161. The outer diameter of the outer sheath layer 16 is 8.0 mm.

The obtained multicore cable was evaluated as described above. The evaluation results are illustrated in Table 1.

[Experimental Examples EI2 through EI9]

The multicore cables are manufactured and evaluated in a manner similar to the experimental example EI1, except that an amount of the lubricant powder coated on the outer surfaces of the plurality of covered wires 11 is varied.

The evaluation results of the experimental examples EI2 through EI9 are also illustrated in Table 1.

TABLE 1

| | COVERAGE (%) | ADHESION (N) | PROCESSABILITY E1 | E2 | E3 | FLEXING RESISTANCE | EVALUATION |
|---|---|---|---|---|---|---|---|
| EI1 | 4.1 | 186.0 | C | C | A | C | C |
| EI2 | 6.7 | 141.8 | C | C | A | C | C |
| EI3 | 17.3 | 91.5 | A | A | A | B | B |
| EI4 | 19.1 | 84.7 | A | A | A | B | B |
| EI5 | 21.4 | 76.6 | A | A | A | B | B |
| EI6 | 33.7 | 57.2 | A | A | A | A | A |
| EI7 | 41.8 | 46.3 | A | A | A | A | A |
| EI8 | 58.3 | 25.7 | A | A | A | A | A |
| EI9 | 97.6 | 17.1 | A | A | C | A | B |

According to the results illustrated in Table 1, it was confirmed that there is a correlation between the coverage of the outer surfaces of the plurality of covered wires 11 by the lubricant powder 15, and the adhesion, and that the adhesion can be significantly reduced to a value less than or equal to 100 N by setting the coverage to a value greater than or equal to 15%. That is, it was confirmed that a multicore cable having excellent stripping properties of the outer sheath layer can be obtained, even in a case where no wrapping is disposed between the outer sheath layer and the plurality of covered wires.

In addition, it was also confirmed that, when the coverage is set to a value greater than or equal to 15%, the processability and the flexing resistance also improve, thereby making the evaluation result of the overall evaluation A or B. It may be regarded that, when the coverage is set to the value greater than or equal to 15%, the outer sheath layer can easily be stripped off from the plurality of covered wires, and the force applied from the outer sheath layer to the plurality of covered wires can be reduced when the multicore cable is bent.

In addition, it was also confirmed that, when the coverage is set to a value greater than or equal to 25%, the stripping properties and the flexing resistance improve further. On the other hand, it was confirmed that, when the coverage is set to a value less than or equal to 70%, it is possible to sufficiently reduce scattering of the lubricant powder to the surrounding when removing a portion of the outer sheath layer at the end portion of the multicore cable in order to connect the multicore cable to a device or the like.

Accordingly to each of the embodiments preferable exemplary implementations described above, it is possible to provide a multicore cable in which an outer sheath layer has excellent stripping properties even in a case where a wrapping is not disposed between a plurality of covered wires and the outer sheath layer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A multicore cable comprising:

a plurality of covered wires having a lubricant powder provided on surfaces thereof; and an outer sheath layer covering outer surfaces of the plurality of covered wires, wherein the outer sheath layer is disposed so as to cover the plurality of covered wires in their entirety, the outer surfaces of the plurality of covered wires, and the outer sheath layer, make contact with one another via the lubricant powder, a coverage of the outer surfaces of the plurality of covered wires by the lubricant powder is greater than or equal to 15% and less than or equal to 70%, and an adhesion per length of 50 mm between the plurality of covered wires and the outer sheath layer is greater than 25 N and less than or equal to 100 N.

2. The multicore cable as claimed in claim 1, wherein the plurality of covered wires include power lines, and a twisted pair signal wires.

3. The multicore cable as claimed in claim 2, wherein the plurality of covered wires include twisted pair cables.

4. The multicore cable as claimed in claim 2, wherein the lubricant powder includes talc.

5. The multicore cable as claimed in claim 2, wherein the outer sheath layer includes a first outer sheath layer disposed on a side of the plurality of covered wires, and a second outer sheath layer covering an outer surface of the first outer sheath layer.

6. The multicore cable as claimed in claim 1, wherein the plurality of covered wires include twisted pair cables.

7. The multicore cable as claimed in claim 1, wherein the lubricant powder includes talc.

8. The multicore cable as claimed in claim 1, wherein the outer sheath layer includes a first outer sheath layer disposed on a side of the plurality of covered wires, and a second outer sheath layer covering an outer surface of the first outer sheath layer.

* * * * *